(12) United States Patent
Takizawa (10) Patent No.: US 8,978,472 B2
(45) Date of Patent: Mar. 17, 2015

(54) GYRO SENSOR, ELECTRONIC APPARATUS, AND METHOD OF MANUFACTURING GYRO SENSOR

(71) Applicant: Seiko Epson Corporation, Tokyo (JP)

(72) Inventor: Teruo Takizawa, Matsumoto (JP)

(73) Assignee: Seiko Epson Corporation (JP)

( * ) Notice: Subject to any disclaimer, the term of this patent is extended or adjusted under 35 U.S.C. 154(b) by 318 days.

(21) Appl. No.: 13/659,475

(22) Filed: Oct. 24, 2012

(65) Prior Publication Data

US 2013/0111991 A1 May 9, 2013

(30) Foreign Application Priority Data

Nov. 4, 2011 (JP) ................................. 2011-242659

(51) Int. Cl.
*G01C 19/56* (2012.01)
*G01C 19/5747* (2012.01)

(52) U.S. Cl.
CPC .................................. *G01C 19/5747* (2013.01)
USPC ...................................................... 73/504.12

(58) Field of Classification Search
CPC ........... G01C 19/5747; G01C 19/5762; G01C 19/5769
USPC ...................................................... 73/504.12
See application file for complete search history.

(56) References Cited

U.S. PATENT DOCUMENTS 8,104,344 B2 * 1/2012 Fujiyoshi et al. .......... 73/504.12

FOREIGN PATENT DOCUMENTS

JP  11-083498  3/1999

* cited by examiner

*Primary Examiner* — John Chapman, Jr.
(74) *Attorney, Agent, or Firm* — Harness, Dickey & Pierce, P.L.C.

(57) ABSTRACT

A gyro sensor according to the invention includes a driving portion that includes a driving support portion connected to a driving spring portion and a detecting portion that includes a detecting support portion connected to the driving support portion with the detecting spring portion interposed. The driving support portion is configured to vibrate in a first axis (X-axis) direction, and the detecting support portion is configured to be displaced in a second axis (Y-axis) direction orthogonal to the first axis (x-axis). When the resonant frequency of the driving portion is $f_1$, the resonant frequency of the detecting portion is $f_2$, the width of the driving spring portion is $w_1$, and the width of the detecting spring portion is $w_2$, Expression (1) below is satisfied.

$$0.87(f_2/f_1) \le (w_2/w_1) \le 1.13(f_2/f_1) \tag{1}$$

(where, $w_1 \ne w_2$ and $f_1 \ne f_2$).

10 Claims, 9 Drawing Sheets

GYRO SENSOR, ELECTRONIC APPARATUS, AND METHOD OF MANUFACTURING GYRO SENSOR

BACKGROUND

1. Technical Field

The invention relates to a gyro sensor, an electronic apparatus, and a method of manufacturing a gyro sensor.

2. Related Art

In recent years, inertial sensors that detect a physical quantity using a silicon microelectromechanical system (MEMS) technique have been developed. Among these inertial sensors, a gyro sensor (angular velocity sensor) that detects angular velocity is used for a hand-shake correction function of digital still cameras (DSC), a motion sensing technique of game machines, and the like.

The gyro sensor includes a driving portion that is actively vibrated and a detecting portion that is displaced by a Coriolis force when an angular velocity is applied. Thus, it is possible to detect an angular velocity from the displacement amount of the detecting portion. In such a gyro sensor, since a difference (detuning frequency) between the resonant frequency of the driving portion and the resonant frequency of the detecting portion in particular has a direct influence on the sensitivity and detection band of the gyro sensor, frequency control is very important. As a method of adjusting frequencies, for example, JP-A-11-83498 discloses an adjustment method that uses laser light.

However, in the case of the adjustment method that uses laser light, there is a limit on a range of frequencies that can be adjusted by a laser apparatus. Thus, it may be difficult to adjust the frequencies if a frequency fluctuation is greater than the limit. Moreover, when any one of the resonant frequency of the driving portion and the resonant frequency of the detecting portion is adjusted, the other resonant frequency may also be changed. As a result, it is difficult to obtain a desired detuning frequency, and the sensitivity properties and the detection band properties of the gyro sensor may deteriorate.

Moreover, when a structural body is vibrated using electrostatic force, there is known a method of adjusting the resonant frequency using a damping effect of a spring due to the Coulomb force. However, if the electrostatic force is increased too much, a sticking phenomenon of the structural body may occur. Thus, a resonant frequency adjustment method that uses electrostatic force may cause the risk of sticking, and there is a problem in that it is difficult to adjust the frequency dramatically.

SUMMARY

An advantage of some aspects of the invention is to provide a gyro sensor having favorable sensitivity properties and favorable detection band properties. Another advantage of some aspects of the invention is to provide an electronic apparatus including the gyro sensor. A further advantage of some aspects of the invention is to provide a method of manufacturing the gyro sensor having favorable sensitivity properties and favorable detection band properties.

Application Example 1

This application example is directed to a gyro sensor including: a driving portion that includes a driving support portion connected to a driving spring portion; and a detecting support portion that is connected to the driving support portion with a detecting spring portion interposed, wherein the driving support portion is configured to vibrate in a first axis direction, and the detecting support portion is configured to be displaced in a second axis direction orthogonal to the first axis direction, and when a resonant frequency of the driving portion is $f_1$, a resonant frequency of the detecting portion is $f_2$, a width of the driving spring portion is $w_1$, and a width of the detecting spring portion is $w_2$, Expression (1) below is satisfied.

$$0.87(f_2/f_1) \leq (w_2/w_1) \leq 1.13(f_2/f_1) \qquad (1)$$

(where, $w_1 \neq w_2$ and $f_1 \neq f_2$)

According to such a gyro sensor, it is possible to suppress a fluctuation of the detuning frequency to be within 10% of the setting value. That is, by setting the ratio of the width $w_2$ of the detecting spring portion to the width $w_1$ of the driving spring portion, it is possible to easily adjust the detuning frequency and to provide favorable sensitivity properties and favorable detection band properties.

Application Example 2

In the gyro sensor according to the application example, Expression (2) below may be satisfied.

$$(w_2/w_1) = (f_2/f_1) \qquad (2)$$

According to such a gyro sensor, it is possible to suppress the dimensional shift (fluctuation of processing processes) of the width $w_1$ of the driving spring portion and the width $w_2$ of the detecting spring portion from affecting the detuning frequency. Thus, such a gyro sensor can have favorable sensitivity properties and favorable detection band properties.

Application Example 3

In the gyro sensor according to the application example, the resonant frequency $f_1$ of the driving portion and the resonant frequency $f_2$ of the detecting portion may have a relation of $f_1 < f_2$.

According to such a gyro sensor, it is possible to provide favorable sensitivity properties and favorable detection band properties.

Application Example 4

In the gyro sensor according to the application example, the driving spring portion and the detecting spring portion may be formed according to a dry-etching method.

According to such a gyro sensor, it is possible to provide favorable sensitivity properties and favorable detection band properties.

Application Example 5

In the gyro sensor according to the application example, the gyro sensor may further include a driving fixed electrode and a detecting fixed electrode, wherein the driving portion may include a driving movable electrode connected to the driving support portion, the driving fixed electrode may be disposed so as to face the driving movable electrode, the detecting portion may include a movable detecting electrode connected to the detecting support portion, and the detecting fixed electrode may be disposed so as to face the movable detecting electrode.

According to such a gyro sensor, it is possible to provide favorable sensitivity properties and favorable detection band properties.

Application Example 6

In the gyro sensor according to the application example, the driving support portion may include an opening, and the detecting portion may be disposed inside the opening.

According to such a gyro sensor, it is possible to reduce the size of the gyro sensor as compared to a case where the detecting portion is disposed outside the driving support portion.

Application Example 7

In the gyro sensor according to the application example, the driving portion may include a first driving portion and a second driving portion that are disposed in a line along the first axis direction, the detecting portion may include a first detecting portion that is connected to the first driving portion, and a second detecting portion that is connected to the second driving portion, and the first driving portion and the second driving portion may vibrate in opposite phases along the first axis direction.

According to such a gyro sensor, it is possible to provide favorable sensitivity properties and favorable detection band properties.

Application Example 8

This application example is directed to an electronic apparatus including the gyro sensor according to the above application example.

According to such an electronic apparatus, since the electronic apparatus includes the gyro sensor according to the above application example, it is possible to provide high accuracy.

Application Example 9

This application example is directed to a method of manufacturing a gyro sensor, including processing a substrate according to a dry-etching method to form a driving portion that includes a driving spring portion and a driving support portion connected to the driving spring portion and a detecting portion that includes a detecting spring portion connected to the driving support portion and a detecting support portion connected to the detecting spring portion, wherein the driving support portion is configured to vibrate in a first axis direction, and the detecting support portion is configured to be displaced in a second axis direction orthogonal to the first axis direction, and when a resonant frequency of the driving portion is $f_1$, a resonant frequency of the detecting portion is $f_2$, a width of the driving spring portion is $w_1$, and a width of the detecting spring portion is $w_2$, Expression (1) below is satisfied.

$$0.87(f_2/f_1) \le (w_2/w_1) \le 1.13(f_2/f_1) \quad (1)$$

(where, $w_1 \ne w_2$ and $f_1 \ne f_2$)

According to such a method of manufacturing a gyro sensor, it is possible to obtain a gyro sensor having favorable sensitivity properties and favorable detection band properties.

Application Example 10

In the method of manufacturing the gyro sensor according to the application example, the dry-etching method may be a Bosch method which alternately repeats a protection film forming process that uses a carbon fluoride gas and an etching process that uses a sulfur fluoride gas.

According to such a method of manufacturing a gyro sensor, it is possible to allow side-etching occurring during an etching step to progress isotropically.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail with reference to the drawings.

1. Gyro Sensor

Figure 1:
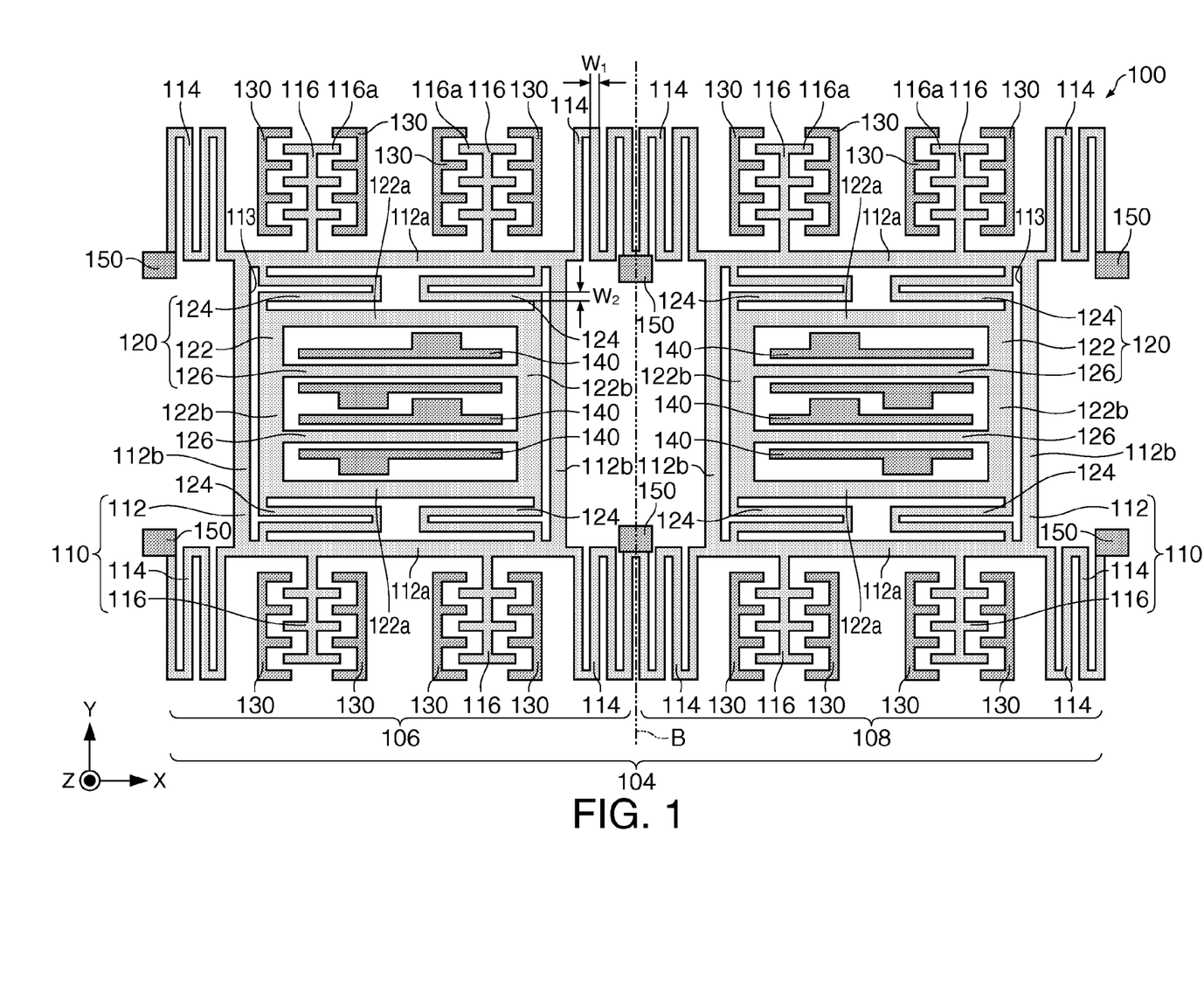
FIG. 1 is a plan view schematically illustrating a gyro sensor according to the present embodiment.

First, a gyro sensor according to this embodiment will be described with reference to the drawings. FIG. 1 is a plan view schematically illustrating a gyro sensor 100 according to the present embodiment. For the sake of convenience, FIG. 1 illustrates three orthogonal axes, in which a first axis is an X-axis, a second axis orthogonal to the first axis is a Y-axis, and a third axis orthogonal to the first and second axes is a Z-axis.

1.1. Configuration

As illustrated in FIG. 1, the gyro sensor 100 may include a vibrating structural body 104, a driving fixed electrode 130, a detecting fixed electrode 140, and a fixing portion 150.

The vibrating structural body 104 is integrally formed by processing a silicon substrate, for example. Therefore, it is possible to apply a microprocessing technique which is used in manufacturing silicon semiconductor devices and to reduce the size of the vibrating structural body 104.

The vibrating structural body 104 is supported by the fixing portion 150. The fixing portion 150 is fixed to a mounting surface 12 (see FIG. 9) of a package 30 that accommodates the gyro sensor 100, for example. The vibrating structural body 104 is disposed to be separated from the mounting surface 12. As illustrated in FIG. 1, the vibrating structural body 104 includes a first vibrating body 106 and a second vibrating body 108, for example. The first vibrating body 106 and the second vibrating body 108 are connected to each other along the X-axis.

The first vibrating body 106 and the second vibrating body 108 may have a shape that is symmetrical with respect to a boundary line B (a straight line extending along the Y-axis) between both bodies. Thus, in the following description, only the configuration of the first vibrating body 106 will be described, and description of the configuration of the second vibrating body 108 will be not provided.

The first vibrating body 106 includes a driving portion 110 and a detecting portion 120. The driving portion 110 may include a driving support portion 112, a driving spring portion 114, and a driving movable electrode 116.

The driving support portion 112 may have an opening 113. That is, the shape of the driving support portion 112 is a frame shape, for example, and the detecting portion 120 is disposed inside (in the opening 113) of the driving support portion 112. In this way, it is possible to reduce the size of the gyro sensor 100 as compared to a case where the detecting portion is disposed outside the driving support portion. In the illustrated example, the driving support portion 112 includes a first extension portion 112a that extends along the X-axis and a second extension portion 112b that extends along the Y-axis.

The driving spring portion 114 is disposed outside the driving support portion 112. In the illustrated example, one end of the driving spring portion 114 is connected to a portion near a corner portion (a connection portion between the first extension portion 112a and the second extension portion 112b) of the driving support portion 112. The other end of the driving spring portion 114 is connected to the fixing portion 150.

In the illustrated example, four driving spring portions 114 are provided in the first vibrating body 106. Thus, the first vibrating body 106 is supported by four fixing portions 150. The fixing portion 150 on the boundary line B between the first vibrating body 106 and the second vibrating body 108 may be not provided.

The driving spring portion 114 has a width of $w_1$ and has a shape such that the driving spring portion 114 extends along the X-axis while reciprocating along the Y-axis. The width $w_1$ is a length in the X-axis direction of a portion of the driving spring portion 114 extending along the Y-axis and is a length in the Y-axis direction of a portion extending along the X-axis. A plurality of the driving spring portions 114 are provided symmetrical with respect to a virtual line (not illustrated) that extends along the X-axis and passes through the center of the driving support portion 112 and a virtual line (not illustrated) that extends along the Y-axis and passes through the center of the driving support portion 112. Since the driving spring portion 114 has the above shape, it is possible to suppress the driving spring portion 114 from being deformed in the Y-axis direction and the Z-axis direction and to allow the driving spring portion 114 to smoothly expand and contract in the X-axis direction which is a vibration direction of the driving portion 110. Moreover, with the expansion and contraction of the driving spring portion 114, it is possible to allow the driving support portion 112 (and the driving portion 110) to vibrate along the X-axis. The number of driving spring portions 114 is not particularly limited as long as it is possible to allow the driving support portion 112 to vibrate along the X-axis.

The driving movable electrode 116 is disposed outside the driving support portion 112 so as to be connected to the driving support portion 112. More specifically, the driving movable electrode 116 is connected to the first extension portion 112a of the driving support portion 112.

The driving fixed electrode 130 is disposed outside the driving support portion 112. The driving fixed electrode 130 is fixed to the mounting surface 12 (see FIG. 9) of the package 30 that accommodates the gyro sensor 100, for example. In the example illustrated in FIG. 1, a plurality of driving fixed electrodes 130 are provided so as to face each other with the driving movable electrode 116 interposed. In the example illustrated in FIG. 1, the driving fixed electrode 130 has a comb-tooth shape, and the driving movable electrode 116 includes protruding portions 116a that are configured to be inserted between the teeth of the driving fixed electrodes 130. The protruding portions 116a are disposed so as to face the driving fixed electrode 130. By decreasing the distance (gap) between the driving fixed electrode 130 and the protruding portions 116a, it is possible to increase electrostatic force between the driving fixed electrode 130 and the driving movable electrode 116.

When a voltage is applied between the driving fixed electrode 130 and the driving movable electrode 116, it is possible to generate electrostatic force between the driving fixed electrode 130 and the driving movable electrode 116. In this way, it is possible to allow the driving support portion 112 (and the driving portion 110) to vibrate along the X-axis while allowing the driving spring portion 114 to expand and contract along the X-axis.

In the illustrated example, although four driving movable electrodes 116 are provided in the first vibrating body 106, the number of driving movable electrodes 116 is not particularly limited as long as it is possible to allow the driving support portion 116 to vibrate along the X-axis. Moreover, in the illustrated example, although the driving fixed electrodes 130 are disposed so as to face each other with the driving movable electrode 116 interposed, the driving fixed electrodes 130 may be disposed on only one side of the driving movable electrode 116 as long as it is possible to allow the driving support portion 112 to vibrate along the X-axis.

The detecting portion 120 is connected to the driving portion 110. In the illustrated example, the detecting portion 120 is disposed inside the driving support portion 112. The detecting portion 120 may include a detecting support portion 122, a detecting spring portion 124, and a movable detecting electrode 126. Although not illustrated in the drawings, the detecting portion 120 may be disposed outside the driving support portion 112 as long as the detecting portion 120 is connected to the driving portion 110.

The shape of the detecting support portion 122 is a frame shape, for example. In the illustrated example, the detecting support portion 122 includes a third extension portion 122a that extends along the X-axis and a fourth extension portion 122b that extends along the Y-axis.

The detecting spring portion 124 is disposed outside the detecting support portion 122. The detecting spring portion 124 connects the detecting support portion 122 and the driving support portion 112. More specifically, one end of the detecting spring portion 124 is connected to a portion near a corner portion (a connection portion between the third extension portion 122a and the fourth extension portion 122b). The other end of the detecting spring portion 124 is connected to the first extension portion 112a of the driving support portion 112.

The detecting spring portion 124 has a width $w_2$ and has a shape such that the detecting spring portion 124 extends along the Y-axis and reciprocates along the X-axis. The width $w_2$ is a length in the Y-axis direction of a portion of the detecting spring portion 124 extending along the X-axis and is a length in the X-axis direction of a portion extending along the Y-axis. In the illustrated example, four detecting spring portions 124 are provided in the first vibrating body 106. A plurality of the detecting spring portions 124 are provided symmetrical with respect to a virtual line (not illustrated) that extends along the X-axis and passes through the center of the detecting support portion 122 and a virtual line (not illustrated) that extends along the Y-axis and passes through the center of the detecting support portion 122. Since the detecting spring portion 124 has the above shape, it is possible to suppress the detecting spring portion 124 from being deformed in the X-axis direction and the Z-axis direction and to allow the detecting spring portion 124 to smoothly expand and contract in the Y-axis direction which is a vibration direction of the detecting portion 120. Moreover, with the expansion and contraction of the detecting spring portion 124, it is possible to allow the detecting support portion 122 (and the detecting portion 120) to vibrate along the Y-axis. The number of detecting spring portions 124 is not particularly limited as long as it is possible to allow the detecting support portion 122 to vibrate along the Y-axis.

The movable detecting electrode 126 is disposed inside the detecting support portion 122 so as to be connected to the detecting support portion 122. In the illustrated example, the movable detecting electrode 126 extends along the X-axis and is connected to two fourth extension portions 122b of the detecting support portion 122.

The detecting fixed electrode 140 is disposed inside the detecting support portion 122. The detecting fixed electrode 140 is disposed so as to face the movable detecting electrode 126. The detecting fixed electrode 140 is fixed to the mounting surface 12 (see FIG. 9) of the package 30 that accommodates the gyro sensor 100, for example. In the example illustrated in FIG. 1, a plurality of the detecting fixed electrodes 140 are disposed so as to face each other with the movable detecting electrode 126 interposed.

The number and the shape of the movable detecting electrodes 126 and the detecting fixed electrodes 140 are not particularly limited as long as it is possible to detect a change in electrostatic capacitance between the movable detecting electrode 126 and the detecting fixed electrode 140.

1.2. Operation

Next, the operation of the gyro sensor 100 will be described. FIGS. 2 to 5 are diagrams illustrating the operation of the gyro sensor 100 according to the present embodiment. For the sake of convenience, in FIGS. 2 to 5, respective portions of the gyro sensor 100 are depicted in a simplified manner. Moreover, FIGS. 2 to 5 illustrate X, Y, and Z-axes as the three orthogonal axes.

Figure 2:
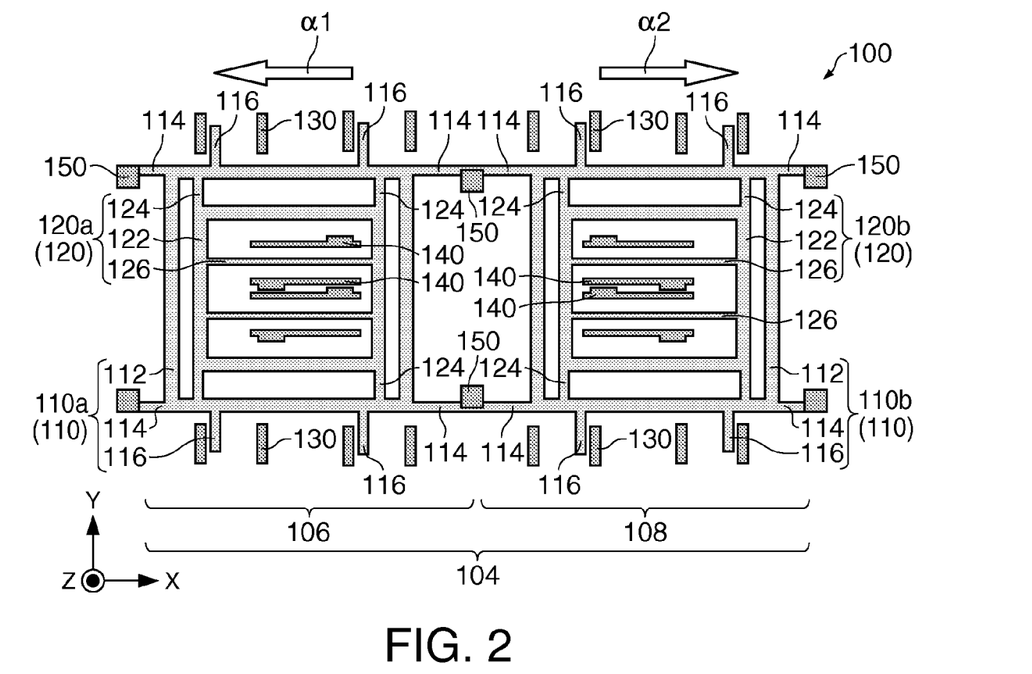
FIG. 2 is a diagram illustrating an operation of the gyro sensor according to the present embodiment.
Figure 3:
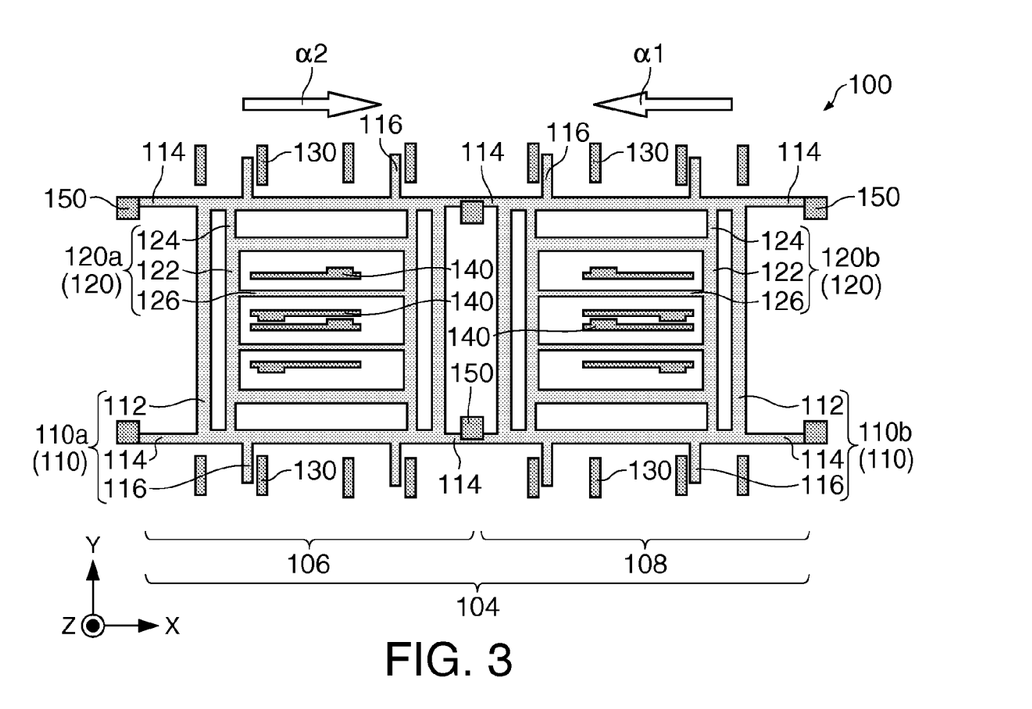
FIG. 3 is a diagram illustrating an operation of the gyro sensor according to the present embodiment.

When a voltage is applied to the driving fixed electrode 130 and the driving movable electrode 116 by a power supply (not illustrated), it is possible to generate electrostatic force between the driving fixed electrode 130 and the driving movable electrode 116. In this way, as illustrated in FIGS. 2 and 3, it is possible to allow the driving spring portion 114 to expand and contract along the X-axis and to allow the driving portion 110 to vibrate along the X-axis.

More specifically, when a first alternating voltage is applied between the driving movable electrode 116 and the driving fixed electrode 130 of the first vibrating body 106, and a second alternating voltage having a phase shift of 180° with respect to the first alternating voltage is applied between the driving movable electrode 116 and the driving fixed electrode 130 of the second vibrating body 108. In this way, it is possible to allow the first driving portion 110a of the first vibrating body 106 and the second driving portion 110b of the second vibrating body 108 to vibrate in opposite phases along the X-axis at a predetermined frequency. That is, the first driving portion 110a and the second driving portion 110b that are connected (arranged in a line) along the X-axis vibrate (in a first mode of vibration) in opposite phases along the X-axis at a resonant frequency $f_1$. For example, first, as illustrated in FIG. 2, the first driving portion 110a is displaced in the direction indicated by α1 and the second driving portion 110b is displaced in the direction indicated by α2 that is opposite to the direction α1. Subsequently, as illustrated in FIG. 3, the first driving portion 110a is displaced in the direction α2, and the second driving portion 110b is displaced in the direction α1. The first driving portion 110a and the second driving portion 110b repeatedly perform this operation. In this way, the first driving portion 110a and the second driving portion 110b vibrate in opposite phases and at the resonant frequency of $f_1$.

Since the detecting portion 120 is connected to the driving portion 110, the detecting portion 120 also vibrates along the X-axis with the vibration of the driving portion 110. That is, the first vibrating body 106 and the second vibrating body 108 vibrate in opposite phases along the X-axis.

Figure 4:
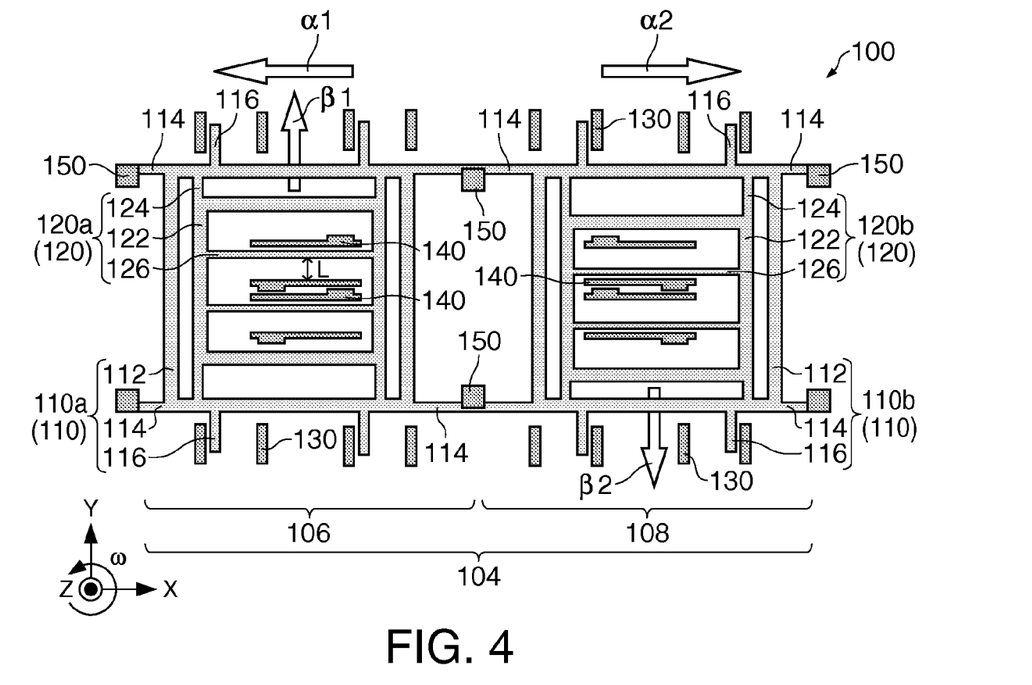
FIG. 4 is a diagram illustrating an operation of the gyro sensor according to the present embodiment.
Figure 5:
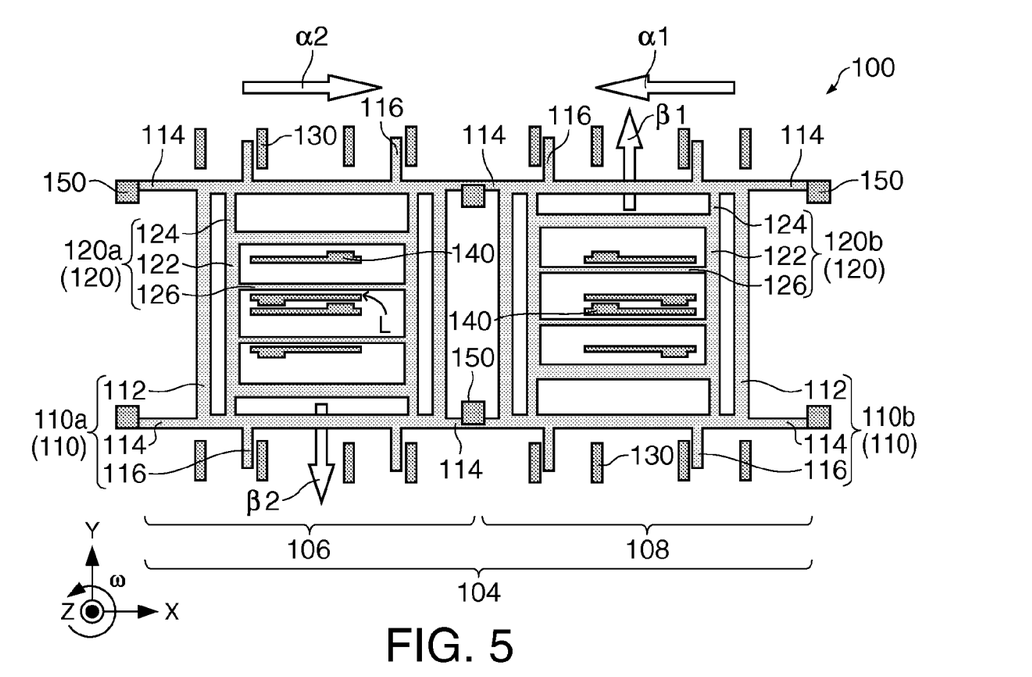
FIG. 5 is a diagram illustrating an operation of the gyro sensor according to the present embodiment.

As illustrated in FIGS. 4 and 5, when an angular velocity ω about the Z-axis is applied to the gyro sensor 100 in a state where the driving portions 110a and 110b vibrate in the first mode of vibration, Coriolis force is added, and the detecting portion 120 is displaced along the Y-axis. That is, the first detecting portion 120a connected to the first driving portion 110a and the second detecting portion 120b connected to the second driving portion 110b are displaced in opposite directions along the Y-axis due to the first mode of vibration and the Coriolis force. For example, first, as illustrated in FIG. 4, the first detecting portion 120a is displaced in the direction indicated by β1, and the second detecting portion 120b is displaced in the direction indicated by β2 that is opposite to the direction β1. Subsequently, as illustrated in FIG. 5, the first detecting portion 120a is displaced in the direction β2, and the second detecting portion 120b is displaced in the direction β1. The first detecting portion 120a and the second detecting portion 120b repeatedly perform this operation. In this way, the first detecting portion 120a and the second detecting portion 120b vibrate in opposite phases and at a resonant frequency of $f_2$.

Since the detecting portions 120a and 120b are displaced along the Y-axis, the distance L between the movable detecting electrode 126 and the detecting fixed electrode 140 changes. Thus, the electrostatic capacitance between the movable detecting electrode 126 and the detecting fixed electrode 140 changes. In the gyro sensor 100, by applying a voltage to the movable detecting electrode 126 and the detecting fixed electrode 140, it is possible to detect the amount of change in the electrostatic capacitance between the movable detecting electrode 126 and the detecting fixed electrode 140 and to obtain the angular velocity ω about the Z-axis.

Although a mode (electrostatic driving method) where the driving portion 110 is driven by electrostatic force has been described, a method of driving the driving portion 110 is not particularly limited, and a piezoelectric driving method, an electromagnetic driving method that uses the Lorentz force of magnetic field, and the like can be applied as a method of driving the driving portion 110.

1.3 Relationship Between Resonant Frequency and Width of Spring Portion

The resonant frequency $f_1$ of the first mode of vibration of the driving portion 110, the resonant frequency $f_2$ of the second mode of vibration of the detecting portion 120, the width $w_1$ of the driving spring portion 114, and the width $w_2$ of the detecting spring portion 124 satisfy Expression (1) below. More preferably, the frequencies and the widths satisfy Expression (2) below. In Expressions (1) and (2), $w_1 \neq w_2$, and $f_1 \neq f_2$.

$$0.87 \frac{f_2}{f_1} \leq \frac{w_2}{w_1} \leq 1.13 \frac{f_2}{f_1} \quad (1)$$

$$\frac{w_2}{w_1} = \frac{f_2}{f_1} \quad (2)$$

By setting the frequencies and the widths so as to satisfy Expression (1), the gyro sensor 100 can suppress a fluctuation (shift from a setting value) of a detuning frequency which is a difference between the resonant frequency of the driving portion 110 and the resonant frequency of the detecting portion 120) to fall within 10%. In general, if a fluctuation of the detuning frequency can be suppressed to fall within 10%, a gyro sensor can provide a sufficient sensitivity and a sufficient detection band and have favorable sensitivity properties and favorable detection band properties.

Further, by setting the frequencies and the widths so as to satisfy Expression (2), the gyro sensor 100 can suppress a dimensional shift of the spring portions 114 and 124 from affecting the detuning frequency even when the widths of the spring portions 114 and 124 shift from the setting values due to the processes for forming the gyro sensor 100. As a result, the gyro sensor can provide a sufficient sensitivity and a sufficient frequency detection band and have favorable sensitivity properties and favorable frequency detection band properties.

The reasons therefor will be described below.

It is assumed that the resonant frequency shifts from $f_0$ (setting value) by an amount of $\Delta f_0$ when the width of the spring portion shifts from w (setting value) by an amount of $\Delta w$. Through an experimental example described later, the inventor has found that the amounts of frequency and width shift satisfy the relationship of Expression (3) below.

$$\frac{\Delta f_0}{f_0} = k \cdot \frac{\Delta w}{w}, k = 1.5 \quad (3)$$

Here, "k" is a proportional coefficient which does not depend on a spring width or a spring length. Moreover, the value of "k" can be estimated as "1.5" as will be described later. From Expression (3), the frequency $f_1'$ of the driving portion 110 when the width $w_1$ of the driving spring portion 114 shifts by $\Delta w_1$ and the frequency $f_2'$ of the detecting portion 120 when the width $w_2$ of the detecting spring portion 124 shifts by $\Delta w_2$ can be respectively expressed as Expressions (4) and (5) below. In Expression (4), "$f_1$" is the resonant frequency (that is, a setting value) when $\Delta w_1=0$, and in Expression (5), "$f_2$" is the resonant frequency (that is, a setting value) when $\Delta w_2=0$.

$$f_1' = f_1\left(1 + k \cdot \frac{\Delta w_1}{w_1}\right) \quad (4)$$

$$f_2' = f_2\left(1 + k \cdot \frac{\Delta w_2}{w_2}\right) \quad (5)$$

From Expressions (4) and (5), a fluctuation $\Delta f'$ of the detuning frequency can be expressed as Expression (6) below. In Expression (6), "$\Delta f$" is a setting value of the detuning frequency (that is, a difference between the resonant frequency $f_1$ of the driving portion 110 when $\Delta w_1=0$ and the resonant frequency $f_2$ of the detecting portion 120 when $\Delta w_2=0$).

$$\Delta f' = f_2' - f_1' = f_2\left(1 + k \cdot \frac{\Delta w_2}{w_2}\right) - f_1\left(1 + k \cdot \frac{\Delta w_1}{w_1}\right) \quad (6)$$

$$= (f_2 - f_1) + k\left(\frac{\Delta w_2}{w_2}f_2 - \frac{\Delta w_1}{w_1}f_1\right)$$

$$= \Delta f + k\left(\frac{\Delta w_2}{w_2}f_2 - \frac{\Delta w_1}{w_1}f_1\right)$$

Here, the quantities of $\Delta w_1$ and $\Delta w_2$ will be discussed. When such a spring structure is manufactured using a silicon MEMS technique, a dimensional shift occurs due to MEMS manufacturing processes. Although a photolithographic error also causes the dimensional shift, a major cause thereof is side-etching (lateral etching) during the etching steps.

In general, when a silicon MEMS structural body is etched, dry-etching called a Bosch method is performed. The Bosch method is a method of realizing deep etching with a high aspect ratio by repeating an etching mode and a protection mode. For example, in the Bosch method, an $SF_6$ gas and a $C_4F_8$ gas are alternately supplied. In a protection mode where the $C_4F_8$ gas is supplied, a material such as Teflon (registered trademark) is deposited by plasma polymerization, and the side walls are coated with a protection film. In an etching mode where the $SF_6$ gas is supplied, the protection film on the bottom surface is etched so that Si is exposed and Si is etched with F-radicals. Additional protection film is deposited before the protection film on the side walls is completely removed. Such operation modes are alternately performed. However, actually, since formation of the protection film is not sufficient in the protection mode, lateral side-etching progresses slightly during the etching mode. This amount of side-etching occurs isotropically and uniformly regardless of the direction of a structural body.

Figure 6:
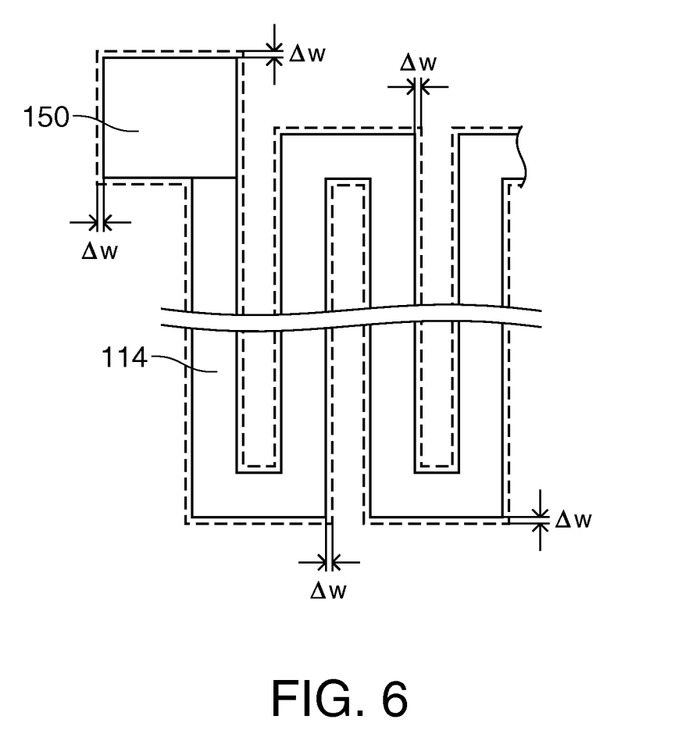
FIG. 6 is a plan view schematically illustrating a part of the gyro sensor according to the present embodiment.

In the vibrating structural body 104 of the gyro sensor 100 according to the embodiment of the invention, the Bosch method can be used in etching of the vibrating structural body 104. That is, a silicon substrate is processed according to the Bosch method, for example to form the vibrating structural body 104 including the driving portion 110 and the detecting portion 120 to thereby manufacture the gyro sensor 100. More specifically, the vibrating structural body 104 can be formed by dry-etching which repeats the protection mode (protection film forming process) that uses the $C_4F_8$ gas and the etching mode (etching process) that uses the $SF_6$ gas. The side-etching that occurs during this etching step progresses basically isotropically regardless of the structure such as a width, a length, or the like of a spring. Thus, as illustrated in FIG. 6, it can be regarded that the amount of side-etching is the same in any directions. Thus, it can be regarded that $\Delta w_2 = \Delta w_1 = \Delta w$. FIG. 6 is a plan view schematically illustrating the driving spring portion 114 and the fixing portion 150 of the gyro sensor 100. In FIG. 6, the shape (design dimension) before etching is depicted by broken lines.

$$\Delta f' = f_2' - f_1' \quad (6')$$

$$= \Delta f + k \cdot \Delta w\left(\frac{f_2}{w_2} - \frac{f_1}{w_1}\right)$$

In designing of general gyro sensors, the resonant frequency $f_2$ of the second mode of vibration of the detecting portion 120 is set to be higher than the resonant frequency $f_1$ of the first mode of vibration of the driving portion 110. That is, $f_2 > f_1$. This is to detect the Coriolis force acting on the detecting portion 120 by causing the Coriolis force to resonate with the resonant frequency of the first mode of vibration. More preferably, $f_2$ may be set to approach $f_1$ while maintaining $f_2 > f_1$. On the other hand, resonance gain decreases greatly if $f_2 < f_1$. In rare cases, although a gyro sensor is designed with $f_2 = f_1$, in this case, detection sensitivity may increase, but it is disadvantageous that it is difficult to secure a sufficient angular velocity detection band. Thus, high-performance gyro sensors used in the recent electronic apparatuses may satisfy the condition of $f_2 > f_1$.

Expression (6)' will be discussed with the above condition kept in mind. Here, if $w_1 = w_2$, the second term on the right side of Expression (6)' has a positive value as long as $f_2 > f_1$. That is, a fluctuation $\Delta f'$ of the detuning frequency always has a positive value and increases in proportion to the side-etching amount $\Delta w$. That is, when the width $w_1$ of the driving spring portion 114 is designed to be the same as the width $w_2$ of the detecting spring portion 124, the detuning frequency is likely to fluctuate due to a dimensional shift during the manufacturing processes.

Therefore, the inventor focused on the second term on the right side of Expression (6)' in order to find such a condition that the detuning frequency does not shift even when the side-etching amount $\Delta w$ due to manufacturing processes changes.

$$\left(\frac{f_2}{w_2} - \frac{f_1}{w_1}\right) = 0,$$

that is, $$\frac{w_2}{w_1} = \frac{f_2}{f_1}$$

Then, the second term on the right side of Expression (6)' becomes zero, and the detuning frequency does not change even when $\Delta w$ changes. That is, when the ratio of the width $w_1$ of the driving spring portion 114 to the width $w_2$ of the detecting spring portion 124 is set to be the same as the ratio of the resonant frequency $f_1$ of the driving portion 110 to the resonant frequency $f_2$ of the detecting portion 120 ($w_1 : w_2 = f_1 : f_2$), it is possible to suppress a fluctuation of the detuning frequency due to a dimensional shift of manufacturing processes. For example, when the frequencies are set so that $f_1 = 4$ kHz and $f_2 = 5$ kHz, the widths may be set so that $w_1 = 4$ μm and $w_2 = 5$ μm.

As described above, when the widths and the frequencies can be set so that $w_1 : w_2 = f_1 : f_2$, it is possible to make the fluctuation of the detuning frequency to be zero. However, actually, it is not necessary to make the fluctuation to be exactly zero, the fluctuation may be suppressed to fall within about 10% of the setting value $\Delta f$ of the detuning frequency. As described above, a fluctuation of 10% or less can be adjusted by a damping effect of a spring by applying an electrostatic bias to the vibrating structural body 104 of the gyro sensor 100.

Next, a condition where the fluctuation $\Delta f'$ of the detuning frequency is suppressed to be within 10% of the setting value $\Delta f$ of the detuning frequency will be discussed. Expression (6)' can be rearranged as Expression (6)" below by introducing parameters $\alpha = w_2/w_1$ and $\beta = f_2/f_1$.

$$\Delta f' = \Delta f + k \cdot \frac{\Delta w}{w_2} f_2 \left(1 - \frac{f_1}{f_2} \cdot \frac{w_2}{w_1}\right) \quad (6)''$$

$$= \Delta f + k \cdot \frac{\Delta w}{w_2} f_2 \left(1 - \frac{\alpha}{\beta}\right)$$

Thus, in order to suppress the fluctuation $\Delta f'$ of the detuning frequency to fall within 10% of the setting value $\Delta f$ of the detuning frequency, only the second term of Expression (6)" may be taken into consideration.

$$\left| k \frac{\Delta w}{w_2} f_2 \left(1 - \frac{\alpha}{\beta}\right) \right| \leq \frac{1}{10} \Delta f \quad (7)$$

First, the lower-limit condition of Expression (7) is calculated as below.

$$k \frac{\Delta w}{w_2} f_2 \left(1 - \frac{\alpha}{\beta}\right) \leq \frac{1}{10} \Delta f \quad (8)$$

$$1 - \frac{\alpha}{\beta} \leq \frac{1}{10} \cdot \frac{1}{k} \cdot \frac{w_2}{\Delta w} \cdot \frac{\Delta f}{f_2}$$

$$\alpha \geq \left(1 - \frac{1}{10} \cdot \frac{1}{k} \cdot \frac{w_2}{\Delta w} \cdot \frac{\Delta f}{f_2}\right) \beta$$

Here, "k" is a proportional constant that represents the relationship between a spring width shift ratio and a frequency shift ratio as will be described later. Moreover, it is not practical to set the ratio of the detuning frequency $\Delta f$ to the resonant frequency $f_2$ of the detecting portion 120 to $\frac{1}{10}$. In general, when vibrating inertial sensors are developed using the silicon MEMS technique, a fluctuation of the resonant frequency due to manufacturing processes is suppressed to be ±10% or less. Thus, it is substantially not practical to set $\Delta f/f_2$ to $\frac{1}{10}$ or smaller. If $\Delta f/f_2$ is set to $\frac{1}{10}$ or less, when the resonant frequency $f_2$ of the detecting portion 120 is set to be greater than the resonant frequency $f_1$ of the driving portion 110, the magnitude relationship between $f_2$ and $f_1$ may be reversed, and $f_2$ may become smaller than $f_1$.

Moreover, as described above, when a silicon substrate is processed during the etching step according to the Bosch etching method, the dimensional shift can be suppressed to be ±10% or less as a target of process development. Thus, it is not practical that the side-etching amount is 10% or more of the width $w_2$ of the detecting spring portion 124, and preferably, the side-etching amount is 5% or less of $w_2$. That is, $\Delta w/w_2$ is substantially $\frac{1}{20}$ or smaller.

Thus, Expression (8) becomes Expression (9) below.

$$\alpha \geq \left(1 - \frac{1}{10} \cdot \frac{1}{k} \cdot \frac{20}{1} \cdot \frac{1}{10}\right) \beta \quad (9)$$

$$\geq \left(1 - \frac{1}{10} \cdot \frac{1}{k} \cdot \frac{w_2}{\Delta w} \cdot \frac{\Delta f}{f_2}\right) \beta$$

$$\geq (1 - 0.13)\beta$$

$$= 0.87\beta$$

Next, the upper-limit condition of Expression (7) will be calculated. Similarly to Expressions (8) and (9), it is possible to obtain Expression (10) below.

$$\alpha \leq \left(1 + \frac{1}{10} \cdot \frac{1}{k} \cdot \frac{20}{1} \cdot \frac{1}{10}\right) \beta \quad (10)$$

$$\leq \left(1 + \frac{1}{10} \cdot \frac{1}{k} \cdot \frac{w_2}{\Delta w} \cdot \frac{\Delta f}{f_2}\right)\beta$$

$$\leq (1 + 0.13)\beta$$

$$= 1.13\beta$$

In Expressions (9) and (10), 1.5 was substituted as "k." From Expressions (9) and (10), since $0.87\beta \leq \alpha \leq 1.13\beta$, it is possible to obtain Expression (1) above. Thus, when the ratio $(w_2/w_1)$ of the width $w_2$ of the detecting spring portion 124 to the width $w_1$ of the driving spring portion 114 is set so as to satisfy Expression (1), it is possible to suppress the fluctuation $\Delta f'$ of the detuning frequency to fall within 10% or smaller of the setting value $\Delta f$.

$$0.87\frac{f_2}{f_1} \leq \frac{w_2}{w_1} \leq 1.13\frac{f_2}{f_1} \quad (1)$$

The gyro sensor 100 according to the present embodiment has the following characteristics, for example.

According to the gyro sensor 100, it is possible to satisfy Expression (1) above. In this way, it is possible to suppress the fluctuation $\Delta f'$ of the detuning frequency to fall within 10% of the setting value $\Delta f$. That is, by setting the ratio between $w_1$ and $w_2$, it is possible to easily adjust the detuning frequency, and the gyro sensor 100 can have favorable sensitivity properties and favorable detection band properties.

According to the gyro sensor 100, it is possible to satisfy Expression (2). In this way, as described above, it is possible to suppress the dimensional shift of the width of the spring portion (fluctuation of processing processes) from affecting the detuning frequency. Thus, the gyro sensor 100 can have favorable sensitivity properties and favorable detection band properties.

2. Experimental Example

Next, an experimental example will be described. The invention is not limited to the following experiment.

Figure 7:
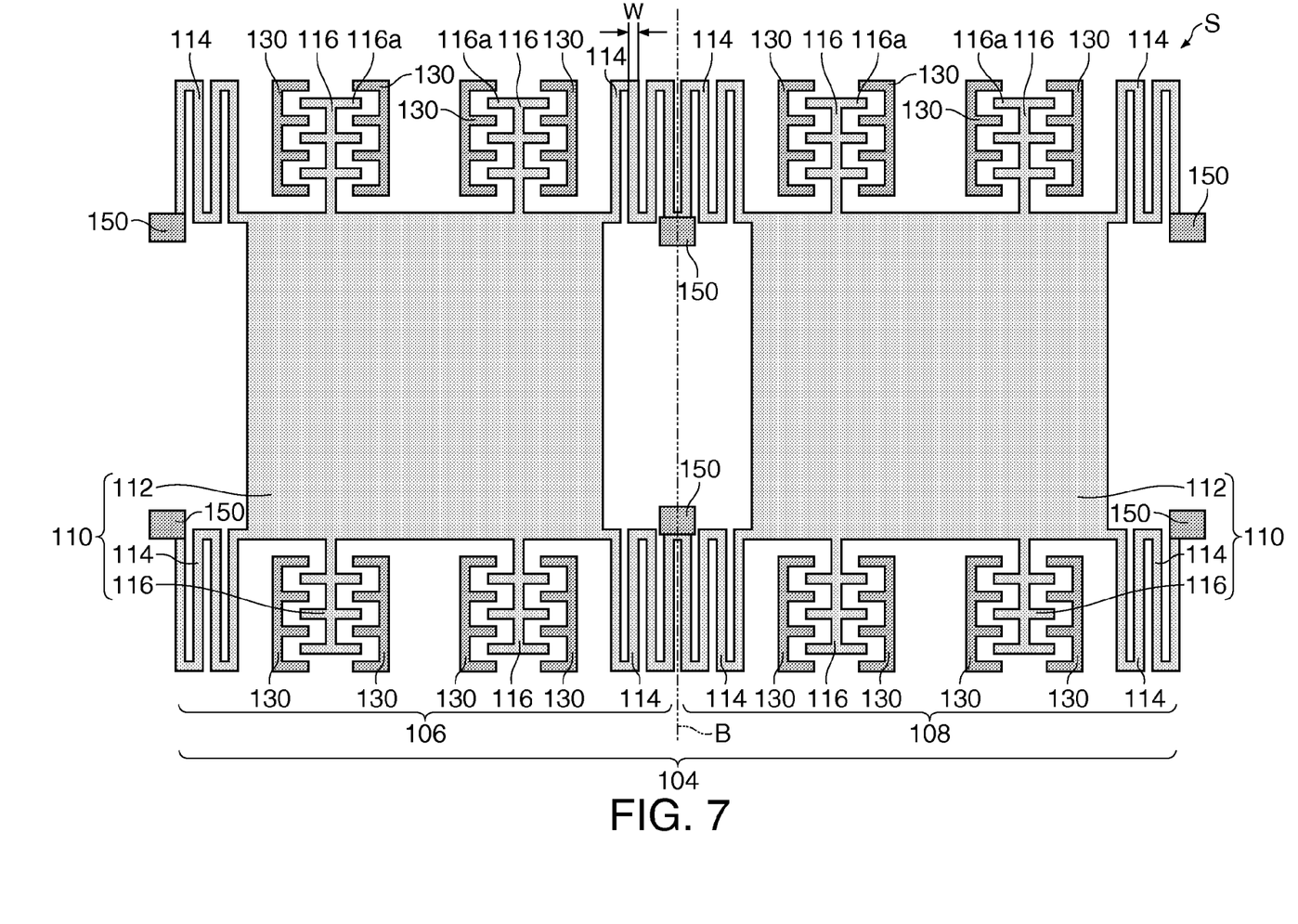
FIG. 7 is a plan view schematically illustrating a structural body according to an experimental example.

A structural body S was used in this experimental example. FIG. 7 is a plan view schematically illustrating the structural body S. In the following description, members of the structural body S used in this experimental example having the same functions as the constituent members of the gyro sensor 100 according to the present embodiment will be denoted by the same reference numerals, and detailed description thereof will be not provided.

As illustrated in FIG. 7, the structural body S has the same configuration as the gyro sensor 100 except that the detecting portion 120 and the detecting fixed electrode 140 are not provided, and the driving support portion 112 does not have the opening 113. That is, the structural body S includes the vibrating structural body 104, the driving fixed electrode 130, and the fixing portion 150. The vibrating structural body 104 includes the first vibrating body 106 and the second vibrating body 108, and the first vibrating body 106 and the second vibrating body 108 have the driving portion 110. The driving portion 110 includes the driving support portion 112, the driving spring portion 114, and the driving movable electrode 116.

Figure 8:
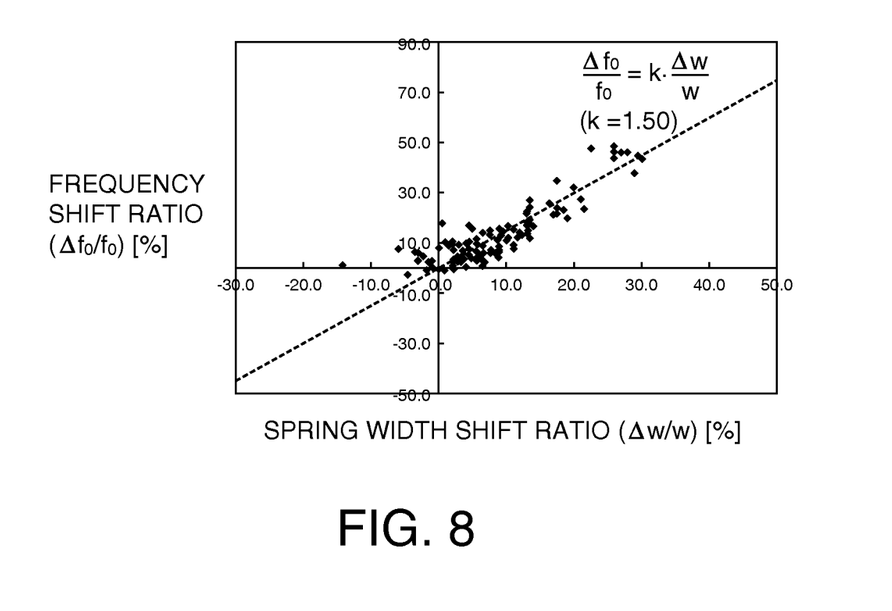
FIG. 8 is a graph illustrating the relationship between a width shift ratio of a spring portion and a frequency shift ratio.

Three types of structural bodies S were formed by changing the setting value w of the width of the driving spring portion 114 to 2 μm, 4 μm, and 8 μm, and were vibrated with a setting value of the resonant frequency set to $f_0$. FIG. 8 is a graph illustrating the relationship between a width shift ratio $(\Delta w/w)$ [%] of the spring portion 114 and a frequency shift ratio $(\Delta f_0/f_0)$ [%] of the structural body S. Here, "$\Delta w$" is a shift amount from "w," and "$\Delta f_0$" is a shift amount from "$f_0$."

As illustrated in FIG. 8, "$\Delta w/w$" and "$\Delta f_0/f_0$" are in a linear relation, and a factor thereof is 1.5. That is, it can be understood that the relation of Expression (3) above is satisfied, and the resonant frequency $f_0$ changes with a proportionality factor of 1.5 when "w" shifts from "$\Delta w$."

3. Electronic Device

Figure 9:
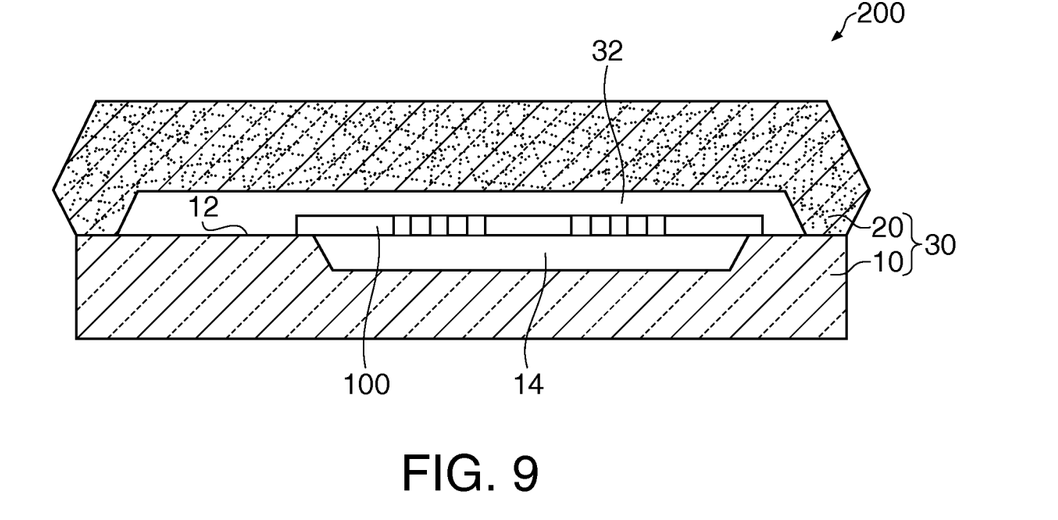
FIG. 9 is a cross-sectional view schematically illustrating an electronic device according to the present embodiment.

Next, an electronic device according to the present embodiment will be described with reference to the drawing. FIG. 9 is a cross-sectional view schematically illustrating an electronic device 200 according to the present embodiment. The electronic device according to the present embodiment includes the gyro sensor according to the embodiment of the invention. In the following description, an electronic device including the gyro sensor 100 as an example of the gyro sensor according to the embodiment of the invention will be described. For the sake of convenience, in FIG. 9, the gyro sensor 100 is depicted in a simplified manner.

As illustrated in FIG. 9, the electronic device 200 includes the gyro sensor 100 and the package 30 that includes a substrate 10 and a lid 20.

As the substrate 10, a glass substrate, a silicon substrate, and a quartz crystal substrate can be used, for example. The substrate 10 supports the gyro sensor 100 on the mounting surface 12. More specifically, a recess 14 is formed on the mounting surface 12 of the substrate 10, and the gyro sensor 100 is disposed above the recess 14. Due to the recess 14, the gyro sensor 100 can operate without being interfered by the substrate 10. The mounting surface 12 is a surface that defines a cavity 32.

The lid 20 is bonded to the substrate 10. As the lid 20, a silicon substrate, a glass substrate, and a quartz crystal substrate can be used, for example. The substrate 10 and the lid 20 may be bonded by anodic bonding, may be bonded by an adhesive agent, and may be bonded by soldering. Alternatively, a thin metal film (not illustrated) may be formed on the respective bonding portions of the substrate 10 and the lid 20, and the thin metal films may be bonded by eutectic bonding, whereby the substrate 10 and the lid 20 are bonded.

The substrate 10 and the lid 20 form the cavity 32 in which the gyro sensor 100 is accommodated. In the illustrated example, a recess is formed in the lid 20, and the recess is sealed by the substrate 10 to form the cavity 32. The shape of the cavity 32 is not particularly limited as long as the gyro sensor 100 can be accommodated in the cavity 32.

The cavity 32 is hermetically sealed in a depressurized state. In this way, it is possible to suppress the vibration of the gyro sensor 100 from being attenuated due to viscosity of the air. A through-hole (not illustrated) may be formed in any one of the substrate 10 and the lid 20, and the cavity 32 may be put into the depressurized state through the through-hole.

In the illustrated example, although the recess that serves as the cavity 32 is formed in the lid 20, the recess may be formed in the substrate 10, and the recess formed in the substrate 10 may be sealed by the lid 20 to form the cavity 32.

According to the electronic device 200, the electronic device 200 includes the gyro sensor 100 having favorable sensitivity properties and favorable detection band properties. Thus, the electronic device 200 can have high accuracy.

4. Electronic Apparatus

Next, an electronic apparatus according to the present embodiment will be described with reference to the drawing.

The electronic apparatus according to the present embodiment includes the electronic device according to the embodiment of the invention. In the following description, an electronic apparatus including the electronic device 200 as an example of the electronic device according to the embodiment of the invention will be described.

Figure 10:
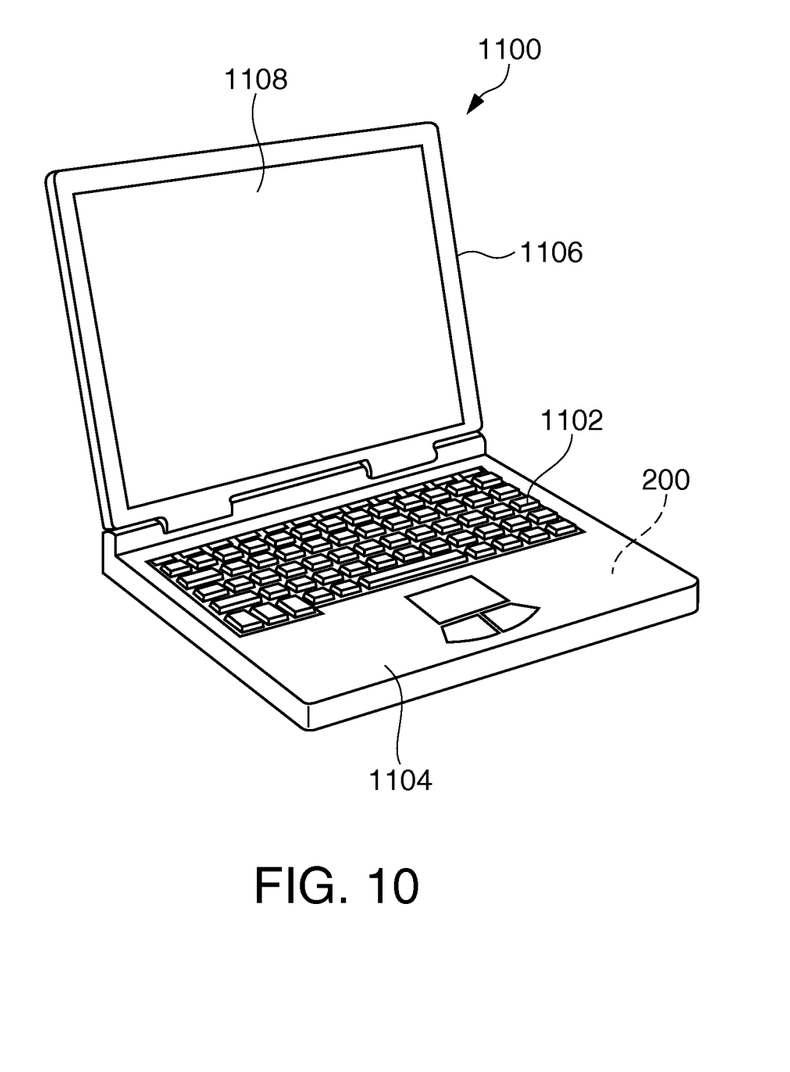
FIG. 10 is a perspective view schematically illustrating an electronic apparatus according to the present embodiment.

FIG. 10 is a perspective view schematically illustrating a mobile-type (or note-type) personal computer 1100 as the electronic apparatus according to the present embodiment.

As illustrated in FIG. 10, the personal computer 1100 includes a body portion 1104 including a keyboard 1102 and a display unit 1106 including a display portion 1108. The display unit 1106 is pivotably supported with respect to the body portion 1104 via a hinge structure.

The electronic device 200 is included in the personal computer 1100.

Figure 11:
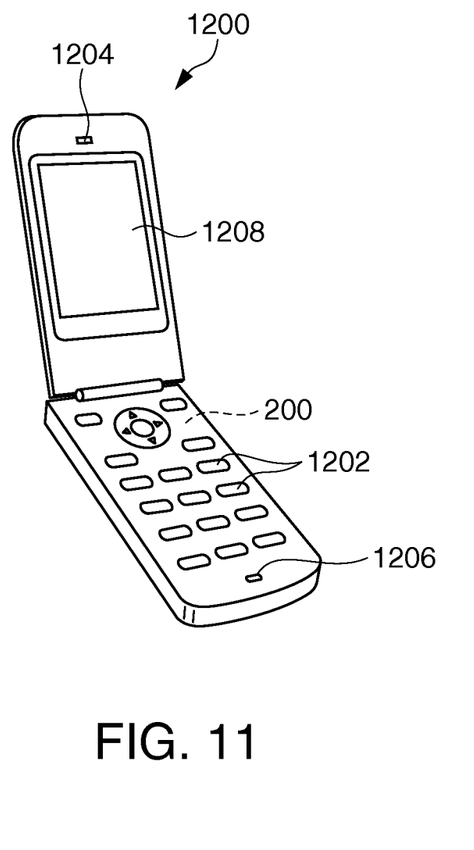
FIG. 11 is a perspective view schematically illustrating an electronic apparatus according to the present embodiment.

FIG. 11 is a perspective view schematically illustrating a portable phone 1200 (including a personal handyphone system (PHS)) as an electronic apparatus according to the present embodiment.

As illustrated in FIG. 11, the portable phone 1200 includes multiple operation buttons 1202, an ear piece 1204, and a mouth piece 1206, and a display portion 100 is disposed between the operation buttons 1202 and the ear piece 1204.

The electronic device 200 is included in the portable phone 1200.

Figure 12:
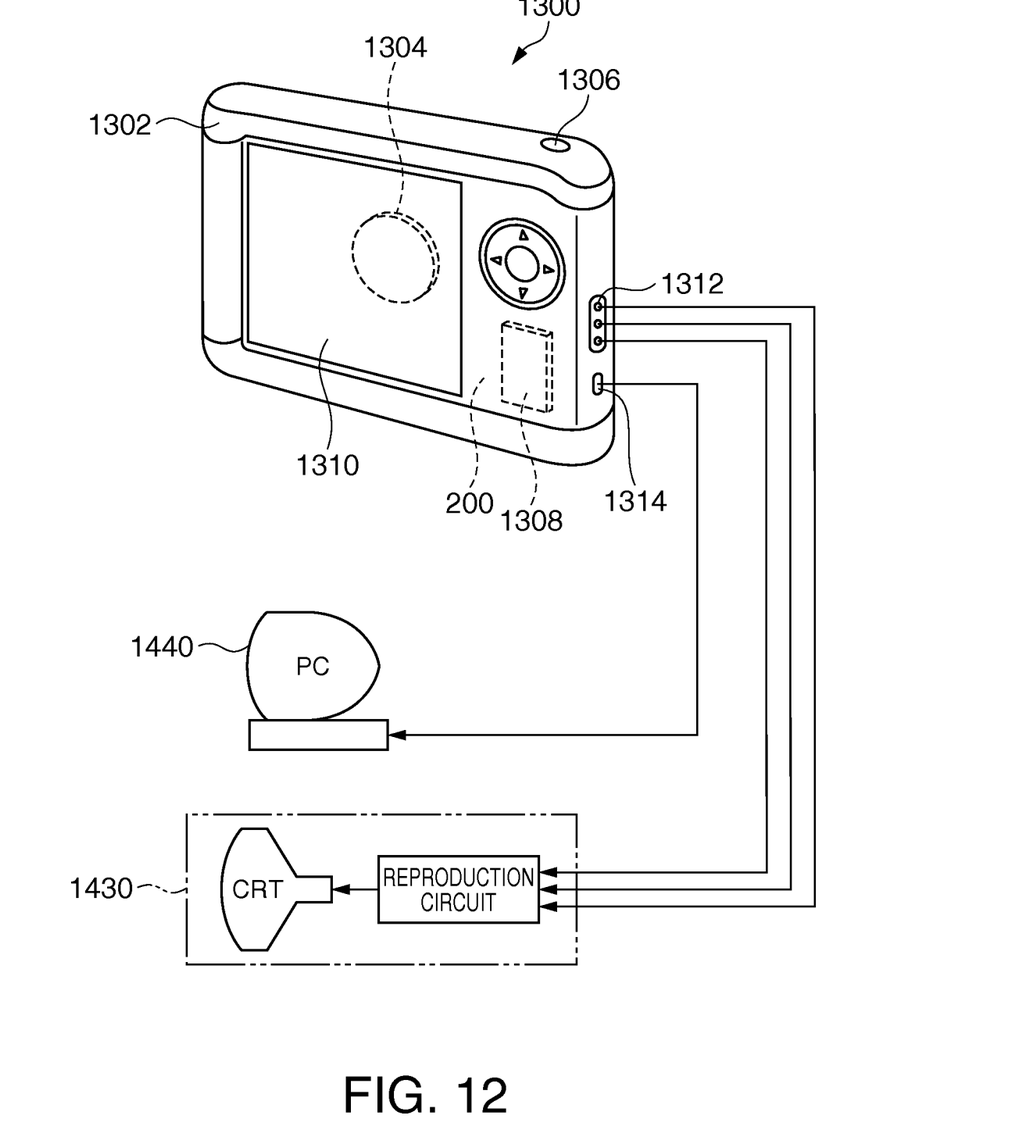
FIG. 12 is a perspective view schematically illustrating an electronic apparatus according to the present embodiment.

FIG. 12 is a perspective view schematically illustrating a digital still camera 1300 as an electronic apparatus according to the present embodiment. In FIG. 12, the illustration of connection to external devices is simplified.

In normal cameras, a silver halide film is sensitized by an optical image of a subject. However, the digital still camera 1300 generates an imaging signal (image signal) by photo-electrically converting the optical image of a subject using an imaging element such as a charge coupled device (CCD).

The display portion 1310 is formed on the back surface of a case (body) 1302 of the digital still camera 1300, and an image is displayed based on an imaging signal generated by the CCD. The display portion 1310 functions as a finder that displays the subject as an electronic image.

Moreover, a light-receiving unit 1304 including an optical lens (imaging optical system), a CCD, and the like is provided on the front surface side (the rear surface side of the drawing) of the case 1302.

When a photographer presses a shutter button 1306 while viewing a subject image displayed on the display portion 1310, an imaging signal generated by the CCD at that point in time is transferred to and stored in a memory 1308.

Moreover, the digital still camera 1300 includes a video signal output terminal 1312 and an input/output terminal 1314 for data communication which are provided on the side surface of the case 1302. Further, as illustrated in the drawing, a television monitor 1430 and a personal computer (PC) 1440 are connected to the video signal output terminal 1312 and the input/output terminal 1314 for data communication, respectively, as necessary. In addition, the imaging signals stored in the memory 1308 are output to the television monitor 1430 or the personal computer 1440 in accordance with a predetermined operation.

The electronic device 200 is included in the digital still camera 1300.

The electronic apparatuses 1100, 1200, and 1300 include the electronic device 200 that includes the gyro sensor 100 having favorable sensitivity properties and favorable detection band properties. Thus, the electronic apparatuses 1100, 1200, and 1300 can have high accuracy.

In addition to the personal computer (mobile-type personal computer) of FIG. 9, the portable phone of FIG. 10, and the digital still camera of FIG. 11, examples of the electronic apparatus including the gyro sensor 100 include an ink jet ejection apparatus (for example, an ink jet printer), a laptop personal computer, a television, a video camera, a video tape recorder, various car navigation apparatuses, a pager, an electronic pocket book (including one with communication capability), an electronic dictionary, a calculator, an electronic game machine, a word processor, a work station, a television phone, a surveillance TV monitor, electronic binoculars, a POS terminal, a medical device (for example, an electronic thermometer, a sphygmomanometer, a glucose meter, an electrocardiogram measuring system, an ultrasonic diagnosis device, and an electronic endoscope), a fish finder, various measurement instruments, various indicators (for example, indicators used in vehicles, airplanes, and ships), a flight simulator, and the like.

The embodiments and modification examples described above are exemplary, and the invention is not limited to these embodiments and modification examples. For example, the respective embodiments and the respective modification examples may be appropriately combined with each other.

The invention includes configurations that are substantially the same as the configurations described in the embodiments (for example, configurations having the same function, method, and results or configuration having the same objects and advantages). Moreover, the invention includes configurations having parts that replace nonessential parts of the configurations described in the embodiments. Furthermore, the invention includes configurations capable of providing the same operational effects or achieving the same objects as those of the configurations described in the embodiments. In addition, the invention includes configurations in which related-art techniques are added to the configurations described in the embodiments.

The entire disclosure of Japanese Patent Application No. 2011-242659, filed Nov. 4, 2011, is expressly incorporated by reference herein.

What is claimed is:

1. A gyro sensor comprising:
a driving portion that includes a driving support portion connected to a driving spring portion; and
a detecting support portion that is connected to the driving support portion with a detecting spring portion interposed, wherein
the driving support portion is configured to vibrate in a first axis direction, and the detecting support portion is configured to be displaced in a second axis direction orthogonal to the first axis direction, and
when a resonant frequency of the driving portion is $f_1$, a resonant frequency of the detecting portion is $f_2$, a width of the driving spring portion is $w_1$, and a width of the detecting spring portion is $w_2$, Expression (1) below is satisfied $$0.87(f_2/f_1) \leq (w_2/w_1) \leq 1.13(f_2/f_1) \qquad (1)$$

(where, $w_1 \neq w_2$ and $f_1 \neq f_2$).

2. The gyro sensor according to claim 1, wherein Expression (2) below is satisfied $$(w_2/w_1) = (f_2/f_1) \qquad (2).$$

3. The gyro sensor according to claim 1, wherein the resonant frequency $f_1$ of the driving portion and the resonant frequency $f_2$ of the detecting portion have a relation of $f_1 < f_2$.

4. The gyro sensor according to claim 1, wherein the driving spring portion and the detecting spring portion are formed according to a dry-etching method.

5. The gyro sensor according to claim 1, further comprising:
- a driving fixed electrode and a detecting fixed electrode, wherein
    - the driving portion includes a driving movable electrode connected to the driving support portion,
    - the driving fixed electrode is disposed so as to face the driving movable electrode,
    - the detecting portion includes a movable detecting electrode connected to the detecting support portion, and
    - the detecting fixed electrode is disposed so as to face the movable detecting electrode.

6. The gyro sensor according to claim 1, wherein
the driving support portion includes an opening, and
the detecting portion is disposed inside the opening.

7. The gyro sensor according to claim 1, wherein
the driving portion includes a first driving portion and a second driving portion that are disposed in a line along the first axis direction,
the detecting portion includes
- a first detecting portion that is connected to the first driving portion, and
- a second detecting portion that is connected to the second driving portion, and the first driving portion and the second driving portion vibrate in opposite phases along the first axis direction.

8. An electronic apparatus comprising the gyro sensor according to claim 1.

9. A method of manufacturing a gyro sensor, comprising:
- processing a substrate according to a dry-etching method to form a driving portion that includes a driving spring portion and a driving support portion connected to the driving spring portion and a detecting portion that includes a detecting spring portion connected to the driving support portion and a detecting support portion connected to the detecting spring portion, wherein the driving support portion is configured to vibrate in a first axis direction, and the detecting support portion is configured to be displaced in a second axis direction orthogonal to the first axis direction, and when a resonant frequency of the driving portion is $f_1$, a resonant frequency of the detecting portion is $f_2$, a width of the driving spring portion is $w_1$, and a width of the detecting spring portion is $w_2$, Expression (1) below is satisfied $$0.87(f_2/f_1) \leq (w_2/w_1) \leq 1.13(f_2/f_1) \tag{1}$$

(where, $w_1 \neq w_2$ and $f_1 \neq f_2$).

10. The method of manufacturing the gyro sensor according to claim 9, wherein
the dry-etching method is a Bosch method which alternately repeats a protection film forming process that uses a carbon fluoride gas and an etching process that uses a sulfur fluoride gas.

\* \* \* \* \*